United States Patent
Seligstein et al.

(10) Patent No.: US 10,046,240 B2
(45) Date of Patent: *Aug. 14, 2018

(54) SOCIAL NETWORKING DATA AUGMENTED GAMING KIOSK

(71) Applicant: Facebook, Inc., Menlo Park, CA (US)

(72) Inventors: Joel Benjamin Seligstein, Mountain View, CA (US); Richard Kenneth Zadorozny, San Bruno, CA (US); Niket Biswas, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 642 days.

This patent is subject to a terminal disclaimer.

(21) Appl. No.: 14/533,011

(22) Filed: Nov. 4, 2014

(65) Prior Publication Data
US 2015/0058144 A1    Feb. 26, 2015

Related U.S. Application Data

(63) Continuation of application No. 13/349,383, filed on Jan. 12, 2012, now Pat. No. 8,909,706.

(51) Int. Cl.
| | |
|---|---|
| *G06Q 20/20* | (2012.01) |
| *A63F 13/795* | (2014.01) |
| *A63F 13/71* | (2014.01) |
| *G06Q 50/00* | (2012.01) |
| *G06F 21/31* | (2013.01) |
| *G06Q 20/10* | (2012.01) |
| *G06Q 20/26* | (2012.01) |
| *G06Q 20/38* | (2012.01) |

(52) U.S. Cl.
CPC ........... *A63F 13/795* (2014.09); *A63F 13/71* (2014.09); *G06F 21/31* (2013.01); *G06Q 20/10* (2013.01); *G06Q 20/20* (2013.01); *G06Q 20/26* (2013.01); *G06Q 20/382* (2013.01); *G06Q 50/01* (2013.01); *A63F 2300/1093* (2013.01); *A63F 2300/203* (2013.01); *A63F 2300/308* (2013.01); *A63F 2300/5546* (2013.01); *A63F 2300/6045* (2013.01); *A63F 2300/69* (2013.01); *A63F 2300/8082* (2013.01)

(58) Field of Classification Search
None
See application file for complete search history.

(56) References Cited

U.S. PATENT DOCUMENTS

2016/0219114 A1* 7/2016 Keyani ................... H04L 67/20

* cited by examiner

*Primary Examiner* — Russell S Glass
(74) *Attorney, Agent, or Firm* — Baker Botts L.L.P.

(57) ABSTRACT

In particular embodiments, a method includes receiving a message in response to detection of a token by a presence reader; transmitting a request to access an account associated with an external network in response to receiving the message; establishing access to the account in response to authentication of the request by a server in the external network; and debiting value from a funding source associated with the account after establishing access to the account.

27 Claims, 7 Drawing Sheets though biometric identification might require more expressive consent due to privacy considerations). Still further, federated access to social network information may be initiated based on receipt of user credentials (e.g., a password) entered at the external system.

SOCIAL NETWORKING DATA AUGMENTED GAMING KIOSK

PRIORITY

This application is a continuation under 35 U.S.C. § 120 of U.S. patent application Ser. No. 13/349,383, filed 12 Jan. 2012, which is incorporated herein by reference.

TECHNICAL FIELD

The present disclosure relates generally to social networking websites and gaming kiosks.

BACKGROUND

Social networks, or social utilities that maintain and enable connections between users (including people, businesses, and other entities), have become prevalent in recent years. In particular, social networking websites allow users to communicate information more efficiently. For example, a user may post contact information, background information, job information, hobbies, and/or other user-specific data to a location associated with the user on a social networking website. Other users can then review the posted data by browsing user profiles or searching for profiles including specific data. The social networking websites also allow users to associate themselves with other users, thus creating a web of connections among the users of the social networking website. These connections among the users can be leveraged by the website to offer more relevant information to each user in view of the users' own stated interests in their connections. These connections may also be leveraged by an external client which interfaces with the website's graph directly, to provide social context to the client application.

A system, such as a website, that allows users to interact with the system typically stores a record for each users of the system. These records may comprise information provided by the user as well as information gathered by the system related to activities or actions of the user on the system. For example, a system may require a user to enter information such as contact information, gender, preferences, interests, and the like in an initial interaction with the system, which is stored in the user's record. A user's activities on the system, such as frequency of access of particular information on the system, also provide information that can be stored in the user's record. The system may then use information provided by the user and information gathered about the user, to customize interactions of the system with the user. For example, a website selling books may keep a record of a users previous purchases and provide the user with information on related books during subsequent interactions with the system. Information in a user's profile may also be used by the system to target advertisements that are of interest to the user. Using information collected from and about users results in a system that is more efficient and beneficial for both the user and the system.

Users typically interact with social networking systems by accessing a web site over a network using a client device, such as a desktop computer or a mobile device. Interactions between users and the social network system can be direct in that the web site that the user accesses hosts a social network application.

Figure 1:
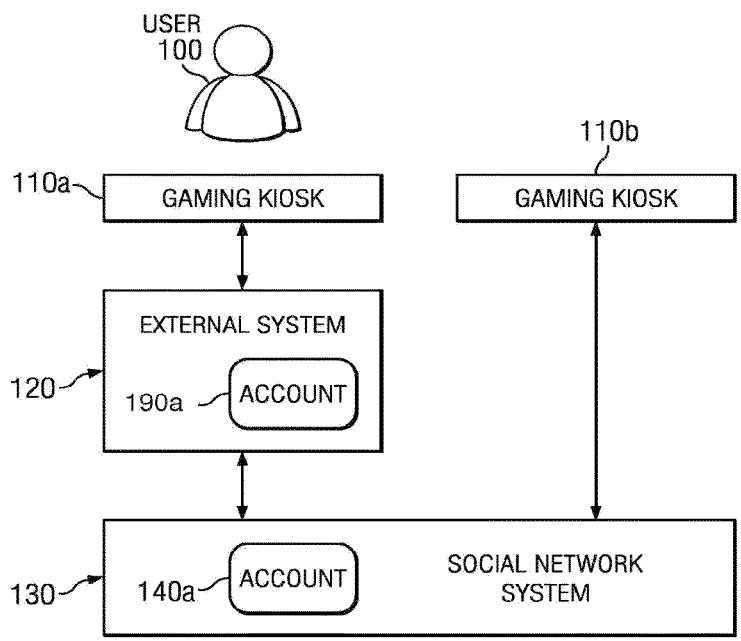
FIG. 1 is high-level diagram illustrating how a gaming kiosk and the social networking system can interact to provide federated access to social network information.

The figures depict particular embodiments for purposes of illustration only. One skilled in the art will readily recognize from the following discussion that alternative embodiments of the structures and methods illustrated herein may be employed without departing from the principles described herein.

DETAILED DESCRIPTION OF EXAMPLE EMBODIMENT(S)

Overview

Particular embodiments relate to a social networking environment including a social networking system and related systems that integrate social network information and access into gaming kiosks or other physical devices to augment user experiences. A social networking system offers its users the ability to communicate and interact with other users of the social networking system. Users join the social networking system and then add connections to a number of other users to whom they desire to be connected. Systems outside of the social networking system, called external systems, can access information available in the social networking system. Users of the external system can be users of a social networking system. The external system can access information from the social networking system using an Application Programming Interface (API) associated with or provided by the social networking system. Alternatively, the external system can send a markup language document to the client device with instructions for interacting with the social networking system. The external system may use the information obtained from the social networking system for various purposes. U.S. application Ser. No. 12/193,709 filed on Aug. 18, 2008; Ser. No. 12/324,761 filed on Nov. 26, 2008; Ser. No. 12/908,921 filed on Jul. 23, 2009; Ser. No. 12/908,923 filed on Jul. 23, 2009; and Ser. No. 12/908,926 filed on Jul. 23, 2009, incorporated by reference herein, describe how third-party web sites may access social network information maintained by a social networking system hosted on a separate domain. As discussed herein, federated access by external systems to social network information may be initiated based on activation or detection of a physical token, such as a credit card, an RFID badge, a bar code, QR code, a mobile device (e.g., a MAC address), and the like (including biometric identification, such as fingerprints and retinal scans). Further, a physical token can include any physical device such as a card or key fob that is both detectable by a gaming kiosk or point-of-sale (POS) terminal operated and associated with his or her social network account. For example, a user may be given a card with a code on it where the user can enter the code to associate the physical card with the his social network account, thus enabling the gaming kiosk or POS to recognize the user's social network account when it detects or recognizes the physical token (in this example, the card).

Particular implementations extend these concepts by allowing federated access to social networking information of a user in various use cases where the user is not currently accessing the social networking system or a third party web site directly with a client device. As described below, a user may initiate a workflow that establishes a federated access session between a third-party system and a social networking system to allow the third-party system to augment the user's experience with social networking information without the user directly accessing either the third-party system or the social networking system. For example, a user may "swipe in" to a gaming kiosk that obtains social information, such as the user's friend's high scores at the same gaming kiosk, and augments the display on the gaming kiosk with the social information. Conversely, the gaming kiosk may update the user's social networking profile page with a story pertaining to an achievement the user has reached on the gaming kiosk.

FIG. 1 shows the interaction between a user 100, gaming kiosk 110, external system 120, and a social networking system 130. A user 100 may be a user of social networking system 130 or one or more of external system 120. Social networking system 130 keeps a user account 140 for each user of social networking system 130. An external system 120 may maintain accounts 190 for users of the respective external system 120. A single user may have accounts 190 on multiple external systems 120.

User 100 may access any number of games or applications on gaming kiosks 110*a* and 110*b*. Gaming kiosks 110 may access social networking system 130 through an intermediate external system 120, as depicted by gaming kiosk 110*a*. For example, user 100 may access a gaming kiosk 110*a* located at his or her own home, such as an Xbox 360 gaming device. Kiosk 110*a* may be associated, via a piece of hardware or a login by user 100, with an account 190*a* on external system 120. In the aforementioned Xbox example, external system 120 is the Xbox Live service, and account 190*a* is user 100's gamer ID. In particular embodiments, external system 120 may be associated with a particular game, game developer, or location. This disclosure contemplates any suitable external system 120. In particular embodiments, gaming kiosk 110 may connect directly to social networking system 130. As illustrated by FIG. 1, gaming kiosk 110*b* may establish a direct connection with social networking system 130 to augment its gaming applications with the display of social data, or to upload gaming data to user account 140*a*.

External system 120 may be operated by a third-party game publisher, such as Electronic Arts, or a entertainment venue, such as Dave & Busters. Users of external system 120 have one accounts and, in some implementations, have physical tokens (such as credit cards or near field communication (NFC) mobile devices) that can be at gaming kiosk 110*a*. External system 120, in one implementation, hosts a web site that allows users to manage their respective accounts.

External system 120 may be operated by a provider of goods and services. For example, external system 120 may correspond to an operator of an entertainment venue, or online gaming service, such as Microsoft Xbox Live or Sony PlayStation Network. As another example, external system 120 may correspond to a financial institution such as American Express with which the user maintains an account and possesses a physical token for, such as a credit card. External system 120 can also include other types of devices that detect or operate in connection with physical tokens, such as Radio Frequency Identification (RFID) presence readers, NFC devices, bar code and/or block code scanners, door key presence readers, smart card presence readers, wireless access points, and the like.

External system 120 can have several users 100 that interact with the system and a user 100 can interact with multiple external systems 120. External system 120 may interact with social networking system 130 to retrieve information available in social networking system 130. A user can link an account 190 on external system 120 with the user's account 140 on social networking system 130. A user can also link an external system 120 with the user's account 140 on social networking system 130 by providing details of the external system to social networking system 130. In this scenario, the user may not have an account on external system 120. If an external system is not linked to the user account of social networking system 130, a request may be sent to the user to link the two accounts. The request may present an interface to the user, allowing the user to input authentication information. If the user successfully provides the authentication information the external system is linked to social networking system 130. If a user links external system 120 with the user's account 140 on social networking system 130, social networking system 130 may store information related to external system 120 (including the users activities on external system 120) along with account 140 of social networking system 130. The information related to linked external systems stored by social networking system 130 is used in an embodiment by social networking system 130 to facilitate the process of the user logging into multiple external systems 120 (and can also be used for other purposes, including to customize or enhance the user's experience on the social networking system, to target advertisements, etc.).

In an embodiment, the login status of all external system 120 linked to social networking system 130 is treated as the same. Accordingly, if a user logs into any one of external system 120, the login status for all external system 120 (that have been linked by the user with the account on the social networking system) is assumed to be "logged in." Similarly, if the user logs out of any one of these external systems 120, the login status for all external system 120 is assumed to be "logged out." The login status for all the linked external systems 120 is stored in social networking system 130. In some implementations, an external system 122, on which a given user does not have an account or an account that is linked with social networking system 130, may be provided with federated access to an account 140 of social networking system 130 via other external systems, such as external system 120, as discussed below. In such systems, the login status of the user may be unaffected by such federated access.

In an embodiment, social networking system 130 maintains a login status of the user 100 in user account 140 when the user logs into any of external system 120. If the user is not logged into any of external system 120, the login status of the user indicates "not logged in." If the user attempts to access social network information from an external system 124, for example, the user is requested to provide authentication information for social networking system 130. If the user successfully authenticates, the login status of the user in social networking system 130 is changed to "logged in." If the user attempts to access any other external system 120, for example, the login status of the user in social networking system 130 is checked. If the login status of the user is determined to be "logged in," the user is allowed access to external system 120. Hence the user is able to access social network information from multiple external systems 120 by authenticating into social networking system 130 once.

In accordance with an embodiment, external system 120 or kiosk 110b can access social networking system 130 information or provide information to social networking system 130 using an Application Programming Interface (API) associated with or provided by social networking system 130. The external system may obtain information from social networking system 130 for various purposes. For example, the external system may present activities of a user's connections on the external system to the user. The external system may also send information related to the user's activities performed on the external system to social networking system 130.

Social networking system 130 maintains information about connections among its users. As used herein, the term "connection" refers to any other user (whether an individual or other entity) of the social networking system to whom a user has formed a connection, association, or relationship via the social networking system. Connections may be added explicitly by a user or automatically created by the social networking system based on common characteristics of the users (e.g., users who are alumni of the same educational institution). Connections in social networks can be one or two-way connections. For example, if Bob and Joe are both users and connected to each other in the website, Bob and Joe have a two-way connection. If Bob is interested in learning more information about Joe, but there is not a reciprocal connection, a one way connection may be formed with Bob being connected to Joe, but Joe not being connected to Bob. The connection between users may be a direct connection; however, some embodiments of a social network allow the connection to be indirect via one or more levels of connections. The social networking system keeps a record of information for each user and the connections among the users. The record of users and their connections in the social networking system may be called a "social graph."

Figure 2:
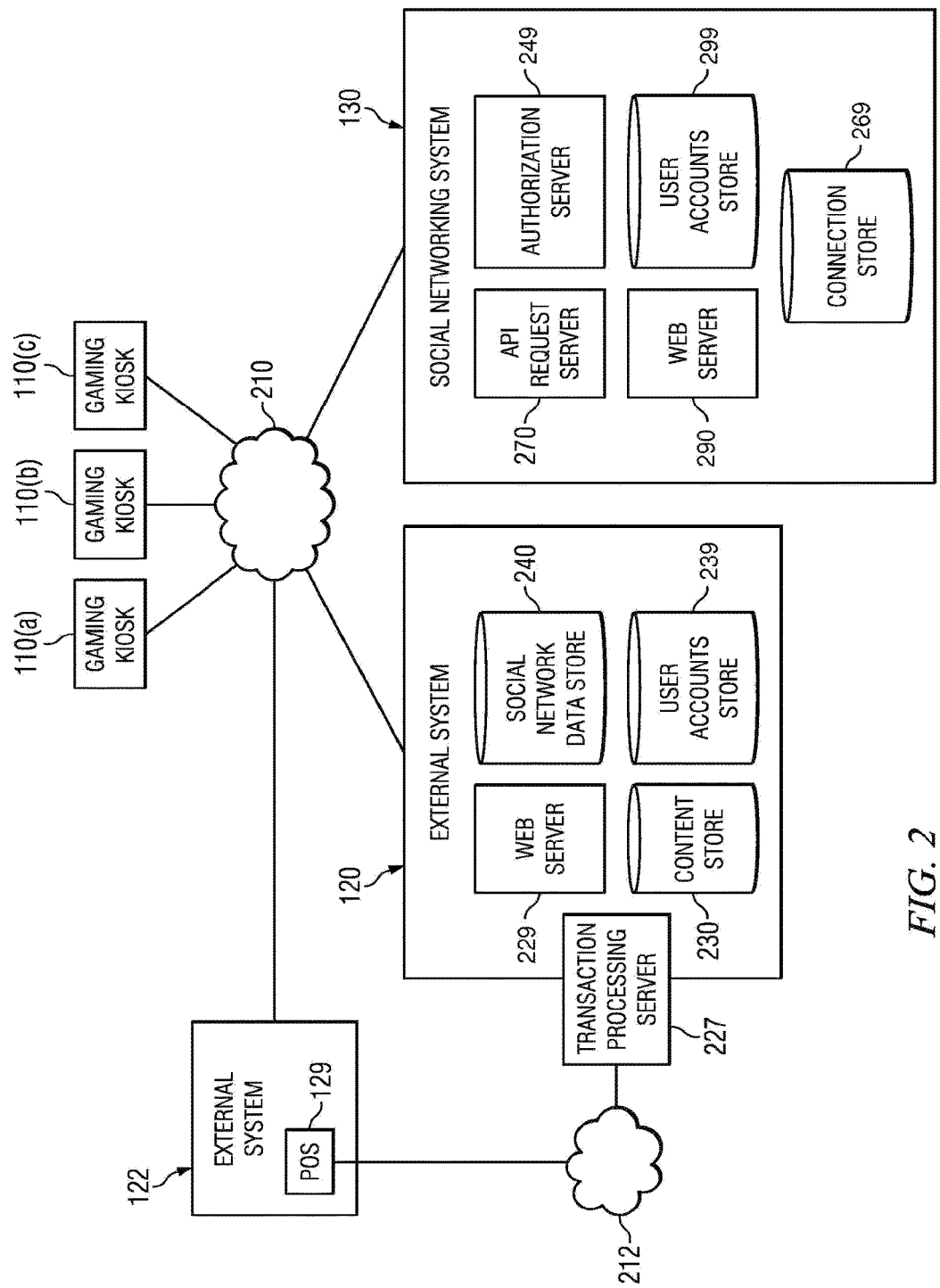
FIG. 2 is a diagram of a social networking system permitting federated access from an external gaming kiosk.

FIG. 2 is a high level block diagram illustrating a system environment suitable for allowing a user to access multiple external systems 120 that interact with a social networking system 130 for retrieving social network information. The system environment, in one example implementation, comprises one or more gaming kiosks 110, one or more external systems 120, a social networking system 130, and network 210. Network 210 may be a wide area, packet-based network such as the Internet. In alternative configurations, different and/or additional modules can be included in the system.

The gaming kiosks 110 comprise one or more computing devices that can receive user input and can transmit and receive data via the network 210. For example, the gaming kiosks 110 may be desktop computers, laptop computers, smart phones, personal digital assistants (PDAs), arcade cabinets, a dedicated social networking gaming interface, or any other device including computing functionality and data communication capabilities. The gaming kiosks 110 are configured to communicate via network 210, which may comprise any combination of local area and/or wide area networks, using both wired and wireless communication systems. The network communication allows these devices to both communicate with one another to enhance gameplay (as in the case of a car racing game or a cooperative fighting game) and also with the external social data providers.

FIG. 2 contains a block diagram of social networking system 130. Social networking system 130 includes a web server 290, an API request server 270, an authorization server 249, a user accounts store 299, and a connection store 269. FIG. 2 also contains a block diagram of external system 120. External system 120 includes a web server 229, a content store 230, a user accounts store 239, and a social network data store 240. In other embodiments, social networking system 130 or external system 120 may include additional, fewer, or different modules for various applications. Conventional components such as network interfaces, security mechanisms, load balancers, failover servers, management and network operations consoles, and the like are not shown so as to not obscure the details of the system.

Social networking system 130 comprises a computing system that allows users to communicate or otherwise interact with each other and access content as described herein. Social networking system 130 stores user information in user accounts store 299, for example, user profile information including biographic, demographic, and other types of descriptive information, such as work experience, educational history, hobbies or preferences, location, and the like. Social networking system 130 further stores data describing one or more connections between different users in the connection store 269. The connection information may indicate users who have similar or common work experience, group memberships, hobbies, or educational history. Additionally, social networking system 130 includes user-defined connections between different users, allowing users to specify their relationships with other users. For example, these user-defined connections allow users to generate relationships with other users that parallel users' real-life relationships, such as friends, co-workers, partners, and so forth. Users may select from predefined types of connections, or define their own connection types as needed.

Social networking system 130 maintains a user profile for each user of the system. Actions that a particular user takes with respect to another user or data objects are associated with each user's profile. Such actions may include, for example, adding a connection to the other user, sending a message to the other user, reading a message from the other user, viewing content associated with the other user, attending an event posted by another user, among others. Social networking system 130 may also enable users to add applications to their profiles. These applications provide enhanced content and interactivity within social networking system 130, which maintains an application object for each application hosted in the system. The applications may be provided by the website operator and/or by third party developers. An example application is an enhanced messaging service, in which users can send virtual objects (such as a "gift" or "flowers") and an optional message to another user. The use of any functionality offered by the application may thus constitute an action by the user in connection with the application. In addition, continuing the example from above, the receipt of the virtual gift or message may also be considered an action in connection with the application 120. It can therefore be appreciated that actions may be passive and need not require active participation by a user. Still further, one or more of the user profiles may have a virtual currency account associated therewith. For example, by using a credit card or by performing requested actions, a user may accumulate virtual currency, such as credits, that can be redeemed for value with external systems or social networking system 130.

In another embodiment, social networking system 130 logs actions taken by its users in the real world. These actions may be recorded by an action terminal, which observes qualifying actions and then communicates that action to social networking system 130. The communication may be via email, SMS, or any other appropriate means, where the communicated message includes sufficient information for social networking system 130 to populate an action log with an entry describing the action. The action terminal may comprise any suitable devices or systems for the particular type of action to be logged.

The web server 290 links social networking system 130 via the network 210 to one or more gaming kiosks 110; the web server 290 serves web pages, as well as other web-related content, such as Java, Flash, XML, and so forth. In some embodiments, the web server may be used for communicating with external system 120. For example, requests sent by external system 120 can be received by the web server 290 and processed. The web server 290 may include a mail server or other messaging functionality for receiving and routing messages between social networking system 130 and the client devices 210. The messages can be instant messages, queued messages (e.g., email), text and SMS messages, or any other suitable messaging technique.

The API request server 270 allows external systems 12-, or gaming kiosks 110, to access information from social networking system 130 by calling APIs. The API request server 270 may also allow external systems 120 to send information to social networking system 130 by calling APIs. An external system 120 sends an API request to social networking system 130 via the network 210. The API request is received at social networking system 130 by the API request server 270. The API request server 270 processes the request by calling the appropriate program code to collect any appropriate response, which is then communicated back to external system 120 via the network 210. In an embodiment, the web server 290 receives a request and calls the API server 270 in order to process the request. The information based on the response from the API server 270 is sent in response to the request received by the web server 290. Information flows in two directions, both from the gaming kiosk 110 to the social networking system 130 via request server 270 and vice versa. An example of communication from gaming kiosk 110 to request server 270 would be the communication of a high score, screenshot or a credit card transaction which adds credits to the stored value account of the source user, or debiting value from the stored value account of the logged in user in exchange for gameplay or virtual goods. Examples of communication from social networking system 130 to gaming kiosk 110 via request server 270 include verifying login for the user, returning the stored value in the logged in user's account, retuning social connections, returning friends' or global high scores and the like. A device that does not communicate with the web server 290 can communicate directly with the API request server 270 to obtain information.

The authorization server 249 enforces the privacy settings of the users of the social networking system. The privacy setting of a user determines how particular information associated with a user can be shared. The privacy setting comprises the specification of particular information associated with a user and the specification of the entity or entities with whom the information can be shared. The entities with which information can be shared may include other users, applications, external systems, or any entity that can potentially access the information. The information that can be shared by a user comprises user profile information photos, videos, links, text entries, phone numbers associated with the user, user's connections, actions taken by the user such as adding a connection, changing user profile information, and any other information maintained by the social networking system that is associates with the user. Systems and methods for allowing an external system to access information in a social networking system using APIs that enforce privacy settings defined in the social networking system are disclosed in U.S. application Ser. No. 12/324,761, filed Nov. 26, 2008, which is incorporated by reference in its entirety. Systems and methods for allowing users to control accessibility of content in a social networking system is disclosed in U.S. application Ser. No. 12/489,896 filed on Jun. 16, 2009, which is incorporated by reference in its entirety. Systems and methods for providing privacy settings for applications associated with a user profile are disclosed in Ser. No. 12/194,886 filed on May 27, 2008, which is incorporated by reference in its entirety.

Figure 3A:
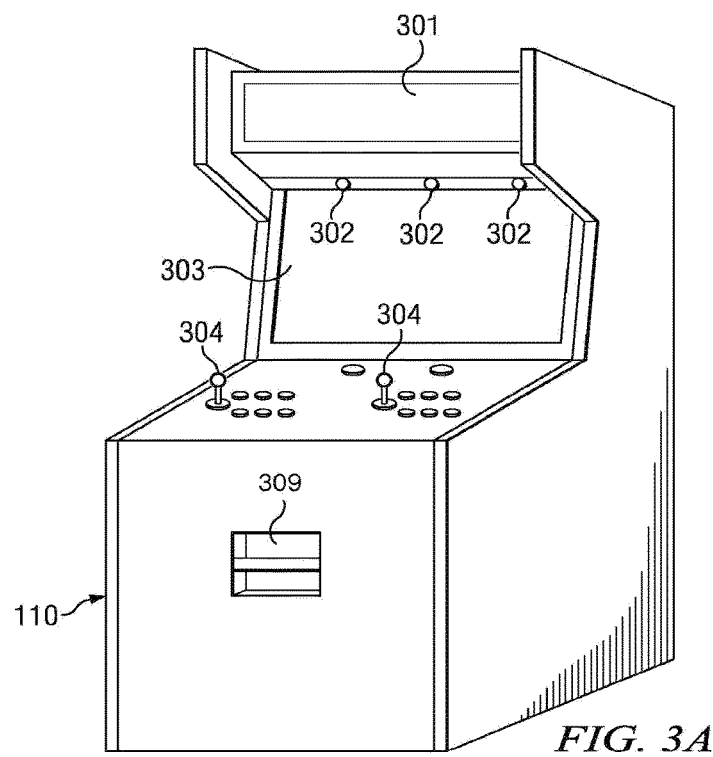
FIG. 3A is an example gaming kiosk

FIG. 3A illustrates an example gaming kiosk 110 typically found in arcades, cafes, movie theatres, and the like. Gaming kiosk 110 may output a visual display via its internal graphics hardware to display 303. In particular embodiments, display 303 also includes audio outputs. In particular embodiments, display 303 may be a touch screen display, and comprise inputs to gaming kiosk 110 as well. Gaming kiosk 110 also includes input devices 304. In particular embodiments, such as FIG. 3A, the input devices 304 may be joysticks. In particular embodiments, they may be track balls or light guns. In particular embodiments, the input may be integrated into display 303 as a touch device. In particular embodiments, input devices 304 may be a steering wheel, dance pad, motion simulator, video recording, optical shape or figure tracking, or other physical input devices. This disclosure contemplates any suitable input device 304.

Gaming kiosk 110 may also include one or more cameras 302. Cameras 302 may be activated to capture user data, such as photos or videos before or during gameplay. In particular embodiments, cameras 302 may be utilized as input devices 304 to control the application or game being executed by the processors of gaming kiosk 110, such as the Microsoft Kinect system. In particular embodiments, cameras 302 may stream their output to an external network, such as the Internet. In particular embodiments, gaming kiosk may use images captured by the one or more cameras 302 in the gaming application. For example, a photo of the player's face may be displayed above his or her in-game avatar, such as a car during a racing game, so that the other players know the identity of a particular car. In particular embodiments, this icon may be the user's profile picture pulled from social networking system 130. In particular embodiments, the cameras 302 may capture a photo of the user's face from various angles, and texture map the photo onto his or her in-game avatar's face. This disclosure contemplates any suitable method of utilizing cameras 302.

In particular embodiments, gaming kiosk 110 includes a presence reader 309. Presence reader 309 receives a physical token from a particular user 100 of the social networking system that identifies his user ID on a social networking system. For example, presence reader 309 may be a magnetic card presence reader that is capable of reading a magnetic card issued to each member of social networking system 130. As another example, presence reader 309 may be equipped with an RFID presence reader that reads a physical token, such as a key fob, that includes a user identifier for the user's account on social networking system 130. As another example, presence reader 309 may be equipped with a near-field communications (NFC) transceiver that communicates with the user's NFC device, such as a mobile phone, to determine the user's social networking user identifier. In particular embodiments, presence reader 309 may be integrated with cameras 302, and be configured to read a QR code displayed by the user, for example, on the screen of his or her mobile device. In particular embodiments, presence reader 309 may possess one or more other wireless communication transceivers, such as Bluetooth, Wi-Fi, or the like. In particular embodiments, presence reader 309 is integrated with a payment presence reader of gaming kiosk 110. This disclosure contemplates any suitable presence reader and degree of integration with gaming kiosk 110.

In particular embodiments, gaming kiosk 110 may include auxiliary display 301. Auxiliary display 301 may be driven, in particular embodiments, by a dedicated social networking gaming application or hardware. In particular embodiments, auxiliary display 301 displays social networking information about the players of gaming kiosk 110 obtained from social networking system 130. For example, auxiliary display 301 may display the users' profile pictures. As another example, auxiliary display 301 may display the users' gaming achievements, such as their ranking, win-loss record, number of hours played, experience level, skill rating, and the like. In particular embodiments, where the users are participating in a ranked match or tournament, auxiliary display 301 may display the tournament bracket. In particular embodiments, auxiliary display 301 may display the input from cameras 302. In particular embodiments, auxiliary display 301 may replicate the view of display 303. In particular embodiments, auxiliary display 301 may overlay social data onto the view of display 303. Auxiliary display 301 may be of any size and type; for example, in particular embodiments, auxiliary display 301 may be projected onto a wall so that a large number of spectators may view the game and social data. This disclosure contemplates any suitable auxiliary display 301 and the display of any data obtained from social networking system 130 upon it.

Figure 3B:
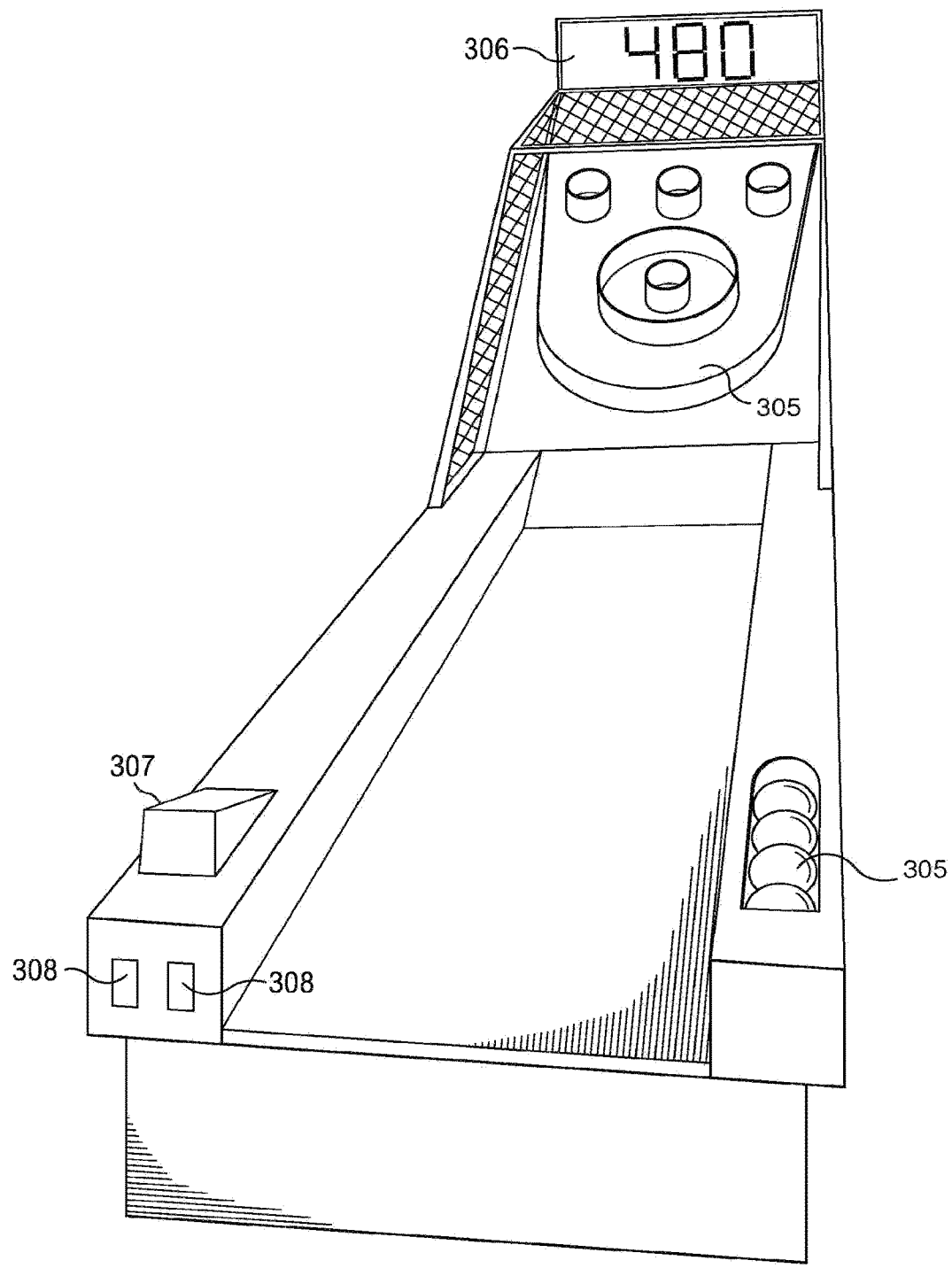
FIG. 3B is an example gaming kiosk.

FIG. 3B illustrates a particular example of an older gaming kiosk 110, in this example, skee-ball, for didactic purposes. Gaming kiosk 110 also possesses a display 306, in this case an array of LEDs for displaying the user's score, and a set of input devices 305, in this case a plurality of balls to be rolled up a ramp into a plurality of targets. Gaming kiosk 110 may also include its own payment presence reader 308, in this case, a receptacle for accepting coins or tokens. Gaming kiosks 110 may be of any age or type, and may be, as in the example of FIG. 3B, fairly primitive. In such scenarios, presence reader 307 may be an external device that may be installed onto gaming kiosk 110 with minimal system-level modification to kiosk 110. In such an example, presence reader 307 may include its own network interface, camera subsystem for taking photos of the user and of display 306, or dedicated hardware for interfacing with kiosk 110. For example, presence reader 307 may obtain the user's score from gaming kiosk 110 by reading particular memory locations from the system board of gaming kiosk 110. This disclosure contemplates any degree of integration of presence reader 307 with gaming kiosk 110.

Figure 4:
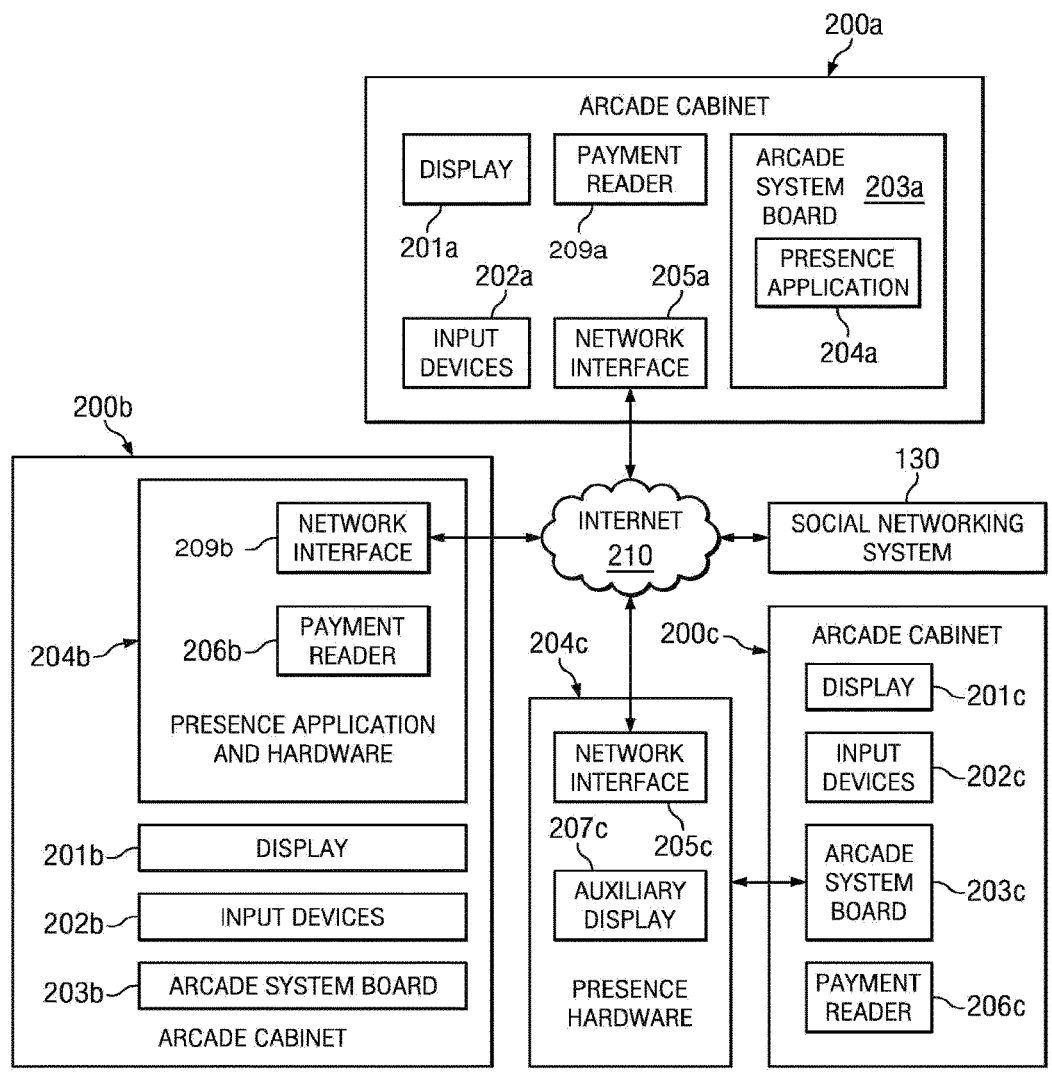
FIG. 4 depicts example gaming kiosks implementing a presence system for federated access to a social networking system.

FIG. 4 illustrates the internal components of three example gaming kiosks 110: arcade cabinets 200a-c. Arcade cabinets 200a-c illustrate three example configurations integrating a social networking presence application. Arcade cabinet 200a illustrates a highly-integrated implementation, whereas arcade cabinet 200c illustrates an essentially unintegrated implementation for older cabinets, such as the skee-ball game depicted in FIG. 3B.

Arcade cabinet 200a illustrates an example implementation wherein a social networking presence application 204a run in memory on arcade system board 203a. Arcade system board 203a is a dedicated computer system created for the purpose of running video arcade games. Arcade system board 203a may consist of a main system board with any number of supporting boards. This disclosure contemplates the use of any suitable arcade system board, such as those manufactured by, for example and not by way of limitation, Atari (such as Vegas and Denver), Capcom (such as CPS-1/2/3), Konami (PC based and Playstation 2 based), Namco, Nintendo (Triforce), Sega, SNK (Neo Geo Multi-video System [MVS]), Taito (Type X/X+/X2/XZero), or a computer-based solution running emulation software.

Arcade system board 203a receives inputs from input devices 202a, outputs video to display 201a, reads payment information from 209a, and may send or receive data to external networks via network interface 205a. In arcade cabinet 200a, presence application 204a may run as a background process resident in the memory of arcade system board 203a. In particular embodiments, presence application 204a may be tightly integrated with applications or games running on arcade system board 203a. In particular embodiments, applications or games running on arcade system board 203a may communicate with presence application 204a via an API that allows presence application 204a to pull any type of information from the application; for example, the score, the current level, the characters selected, the player health, any achievements, which player won, etc. In such embodiments, any in-game information may be extracted by presence application 204a for publishing to social networking system 130.

Arcade cabinet 200b illustrates an example implementation wherein a asocial networking presence application 204b includes its own hardware. For example, typical arcade cabinets 200b may not include network interface cards, and in such implementations, presence hardware 204b includes its own network interface card 209b. In particular embodiments, presence hardware 204b may include its own reader hardware 206b for reading a physical token associated with a user account of social networking system 130. In particular embodiments, users may pay for access to arcade cabinet 200b via credits purchased and retained on social networking system 130. For example, after swiping in with a physical token, presence application 204b may prompt the user whether he or she wishes to pay with virtual credits purchased or won and associated with the user's social networking account. In particular embodiments, presence application 204b may prompt the user as to whether he or she would like to pay via a credit card stored in association with the user's account on social networking system 130. This disclosure contemplates any suitable means of payment processing.

In particular embodiments, arcade cabinet 200c may be connected via an external connector to presence hardware 204c. In such embodiments, presence hardware 204c may be considered a standalone box that requires little integration with arcade cabinet 200c. In particular embodiments, presence hardware 204c may include its own camera subsystem. This disclosure contemplates any suitable degree of integration of presence applications 204a-c with arcade cabinets 200a-c.

Presence applications 204a-c are responsible for obtaining gaming information and uploading it to social networking system 130, as well as obtaining social information from social networking system 130 for display at arcade cabinets 200a-c. The amount of gaming information available to presence applications 204a-c depend on the degree of integration between arcade cabinets 200a-c and presence applications 204a-c. In an example low-integration implementation, presence application may only be able to retrieve from the arcade cabinet that a game started or ended, and take a screenshot or capture of the image on the display. In such implementations, presence application may be programmed to capture an image from its camera subsystems at predetermined intervals, such as when the game ends, or every 30 seconds. In particular implementations, presence applications 204a-c may be programmed to capture images upon particular triggering events, such as a player winning or losing. In particular embodiments, the triggering event may be combos or large increases or decreases in score or life. In particular embodiments, a "capture screenshot" button may be integrated in gaming kiosk 110's user interface, allowing a user to take a screenshot at any moment and post it to the social networking system. In other implementations, presence application 204a-c may be able to read scores and other values from arcade system boards 203a-c by reading particular memory locations for particular applications. Such techniques of reading game data from application memory are well known in the art. In other implementations, arcade system boards 203a-c will be programmed with games with deep integration with social networking system 130 to send scores, achievements earned, top scores, replays and statistics tied to a user's game account, such as a Battlenet account in StarCraft II by Blizzard. This disclosure contemplates any suitable method of obtaining gaming information from gaming kiosks 110.

Figure 5A:
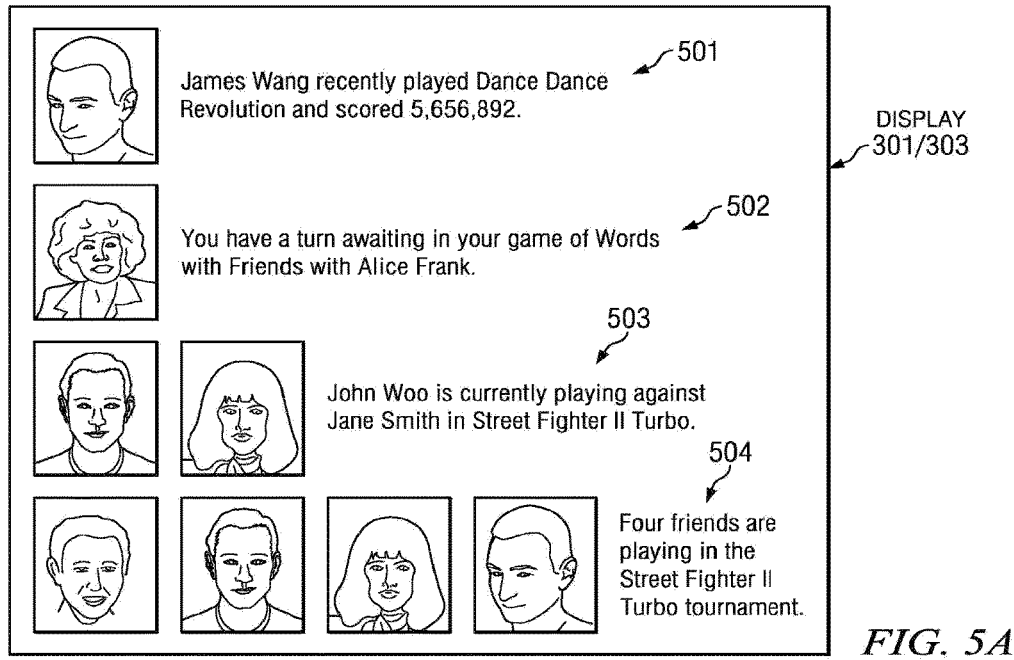
FIG. 5A is an example display of a gaming kiosk augmented with social information.

FIG. 5A illustrates an example of social networking information obtained from social networking system 130 and graphically presented on display 303 or auxiliary display 301 of a gaming kiosk 100. Story 501 states that one of the user's friends, in this example "James Wang", played an application, in this example, "Dance Dance Revolution", and obtained a particular score. In particular embodiments, story 501 may also include other information from social networking system 130, such as the friend's profile picture, or the date and time the story was generated. In particular embodiments, story 501 may include information retrieved from the gaming kiosk used by the friend and uploaded to social networking system 130, such as a screenshot or video of the user during game play, a screenshot/video of the game display during game play, or any score or achievement data obtained from gaming kiosk 110. In particular embodiments, presence application only requests social data for the user's friends who have used games or applications that are currently available for play on the currently used gaming kiosk.

Story 502 indicates that it is currently the user's turn in a turn-based game with one of the user's friends, in this example, "Alice Frank." In particular embodiments, when a user swipes in to a gaming kiosk 110, he or she is given the option to make moves or turns in ongoing turn-based games, such as Scrabble, chess, checkers, and the like. In such embodiments, only stories relating to games that are playable on the gaming kiosk accessed by the user are displayed.

Story 503 indicates that one or more friends of the user are playing each other in a particular gaming application. In this case, one or both of "John Woo" and "Jane Smith" may be the user's friends. In particular embodiments, presence application 204a-c only displays gaming stories about ongoing games if the players are in the same physical location as the user. In particular embodiments, presence application 204a-c only displays gaming stories about ongoing games if the user may join into the game remotely. For example, John Woo, Jane Smith, and the user may be at separate kiosks around the globe, playing the same application over a network. In such an embodiment, the user may select story 503 in order to join the game or claim "next" with the winner of the match. In particular embodiments, the user may choose to watch the ongoing match over the network connection substantially in real-time. In particular embodiments, story 503 may be updated substantially in real-time as the game progresses; for example, with a live play-by-play of the ongoing match. For example, the feed may be updated to read "John Woo just landed a five-hit combo on Jane Smith" or "Jane Smith just defeated John Woo." This disclosure contemplates any manner of updating story 503 and any suitable action following user selection of the story. All updates of stories or information back to the target user to social networking system 130 or any external clients or servers will adhere to the aforementioned privacy requirements explained here.

Story 504 indicates that four of the user's friends are participating in a gaming tournament for a particular game. In particular embodiments, the user may view the tournament ladder, select any particular match, view a particular match substantially in real-time, and the like. In particular embodiments, the particular game will use information stored both on social networking system 130 and external networking systems, such as a Blizzard's Battlenet, in order to rank, match and conduct tournament activities. In particular embodiments, presence application 204a-c may permit the user to join the tournament. In particular embodiments, presence application 204a-c may display a countdown timer for the period in which the user may still join the tournament. This disclosure contemplates the display of any suitable tournament information and any suitable actions for the user.

In particular embodiments, upon swiping into a particular gaming kiosk 110, presence application 204a-c may display the friends of the user who have recently played gaming applications that are available on the user's gaming kiosk 110. In particular embodiments, presence application 205 is a web-based application, such as a HTML5 mobile application. In such embodiments, each game that may be played on gaming kiosk 110 may be considered a separate web application to social networking system 130, and the particular gaming kiosk 110 may be simply a particular platform for various web applications. In such embodiments gaming kiosks 110 are merely an extension of the platform of social networking system 130. For further detail on platform-specific application rendering, please see [REFERENCE MOBILE CANVAS APP].

In particular embodiments, presence application 204a-c displays all gaming stories regardless of their playability to the user. In particular embodiments, presence application 204a-c displays gaming stories that occur in the same physical location, or gaming stories that are joinable from the current location. In particular embodiments, stories 501-504 may be sorted chronologically. In particular embodiments, stories 501-504 may be sorted based on a social coefficient between the user and the one or more friends. In particular embodiments, stories 501-504 may be sorted based on the user's affinity for the gaming application described in the story. In particular embodiments, stories 501-504 may be sorted by physical proximity to the user.

This disclosure contemplates any suitable method of sorting and displaying social gaming data.

Figure 5B:
FIG. 5B is an example newsfeed on a social networking website augmented by gaming information from a gaming kiosk.

FIG. 5B illustrates several example gaming stories 506-509 that may be displayed by social networking system 130 to a user when he or she accesses the social networking website. In particular embodiments, stories 506-509 may be displayed in the user's "newsfeed" 505, an aggregated collection of stories pertaining to the user's first-degree connections.

Stories 506-508 are substantially identical to stories 501-504; that is, when a particular user logs into a gaming kiosk 110 or to his account on social networking system 130, presence application 204 or web server 250 displays the same set of gaming stories. In FIG. 5B, each story also includes, in particular embodiments, the time the story was generated and the location of the gaming kiosk 110 from which the story was generated.

In particular embodiments, newsfeed stories 506-509 may include a screenshot of the gaming application at the time of story generation, as in newsfeed story 507. In the example of 507, a friend of the user, "Edmund Bollinger", reached an achievement in a gaming application "Initial D." Newsfeed story 507 may include a screenshot of the achievement screen, or a image or video capture of the user at the time of achievement.

Each of the stories 506-509 may include, in particular embodiments, the profile picture of the user's friends in question. In particular embodiments, such as in story 508, social networking system 130 may display a photo of the one or more of the user's friends, taken from the gaming kiosk at the time of story generation, in lieu of or in addition to a profile picture. In particular embodiments, in addition to being able to comment or "like" particular newsfeed stories 506-509, social networking system 130 permits a user to select a "watch" link and view the ongoing match substantially in real-time. In particular embodiments, social networking system 130 may store a copy of a previously occurring match, and permit the user to watch the match after the fact.

In particular embodiments, a user may subscribe to, or "follow," other users who are not friends with the user; for example, if the user wishes to follow the public updates of one or more celebrities, he or she may choose to follow them and may view their updates, even without the celebrity accepting their follow request. In such embodiments, the followed user may choose to make his or her gaming stories public, as in example 509. In particular embodiments, clicking the "watch" link plays a video of not the actual game play, but the users of the gaming kiosk during game play. This video is of particular interest when the players are famous, or where the gaming application being played requires bodily movement, such as Dance Dance Revolution, Pop-A-Shot, or Kinect-style games.

Figure 6:
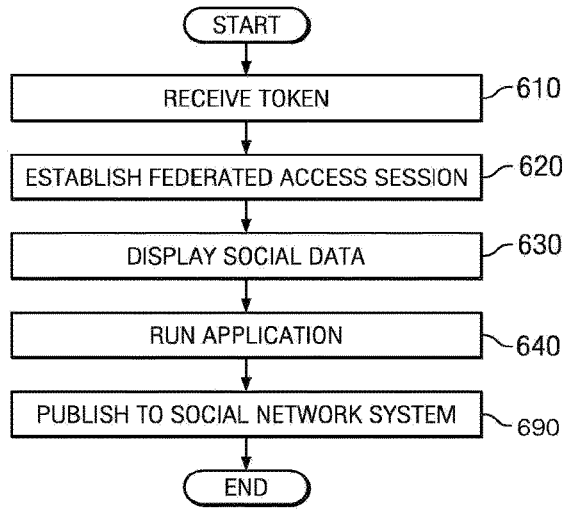
FIG. 6 is an example method of augmenting a gaming kiosk with social data or augmenting a social network with gaming data.

FIG. 6 illustrates an example method of receiving social data and publishing gaming data by a gaming kiosk 110 according to particular embodiments. At Step 610 gaming kiosk 110 receives a physical token from the user. As previously disclosed, the physical token may be a magnetic swipe card, such as a gaming card or credit card, an RFID token, a NFC bump from a mobile device such as a cell phone, a QR code read from cameras 302, a USB key inserted into gaming kiosk 110, or any other physical or wireless connection. As previously disclosed, physical token may be used in conjunction with or as a replacement to a payment card. For example, the physical token may be a credit card or gaming card that acts both to pay for access to the game as well as deliver the user's social networking ID to gaming kiosk 110. In particular embodiments, the user may pay for access to gaming applications on gaming kiosk 110 with credits stored in association with his or her user account on social networking system 130. In particular embodiments, the user may pay for access to particular applications on gaming kiosk 110 via a funding source linked with his or her social networking account, such as a credit card, gift cart, bank account, and the like.

As previously discussed, gaming kiosk 110 may be linked with external system 120, which acts as an intermediary for the transmission of social data to gaming kiosk 110 or the transmission of gaming data to social networking system 130. For example, in particular embodiments, a user may be able to play Xbox Live games at a gaming kiosk 110, which does not directly communicate with the social networking system. The user's physical token may only contain his or her Xbox Live Gamer ID, which is associated with the user's social networking ID by external system 120.

At Step 620, gaming kiosk 110, whether directly or via external system 120, establishes a federated access session with social networking system 130. The process of establishing a federated access session is described in further detail with reference to the call flows of FIGS. 7 and 8

At Step 630, presence application 204 on gaming kiosk 110 retrieves social information about the user or the user's first-degree connections as previously discussed. In particular embodiments, gaming kiosk 110 may include a plurality of selectable gaming applications, and presence application 204 alters the displayed social information for each selected gaming application.

At Step 640, upon payment authorization and selection of a particular gaming application, gaming kiosk 110 runs the game via its arcade system board 203, and the user may interact with and use the gaming application as normal. In particular embodiments, presence application 204 runs as a background process during execution of the gaming application, and may capture screenshots, photos from cameras 302, gaming data such as achievements, etc., and publish to social networking system 130 simultaneously with game play in adherence to the user's aforementioned privacy controls. In particular embodiments, presence application 204 publishes after the game has finished. In particular embodiments, background processes transferring photos, video streams, scores and information will be stored temporarily on the gaming kiosk 110 for performance reasons and then discarded immediately following the game's completion.

At Step 690, presence application 204 publishes gaming data to social networking system 130. In particular embodiments, the gaming updates are pushed to social networking system 130's servers as status updates to be published on a landing page, wall, or newsfeed of a particular user of social networking system 130. In particular embodiments, the gaming updates include a location and time of update. In particular embodiments, presence application 204 on gaming kiosk 110 transmits a screenshot of the game play display, a video of game play, a photo of the user, or a video of the user. This disclosure contemplates the transmission of any suitable game play data to social networking system 130.

Figure 7:
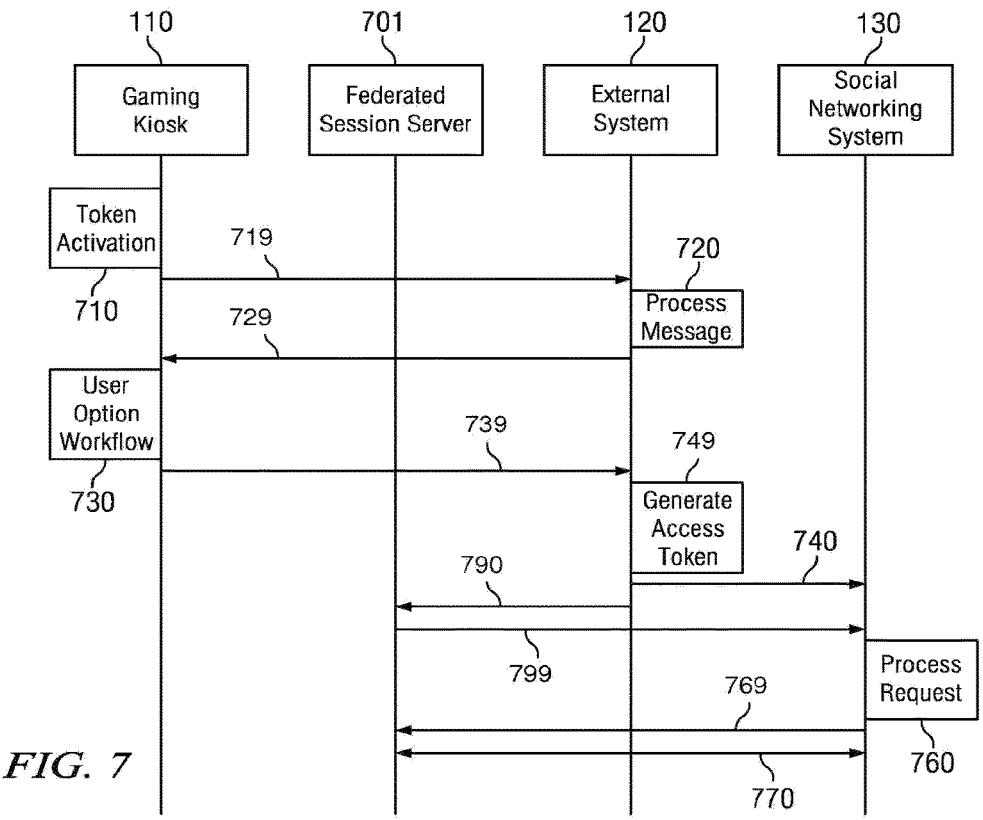
FIG. 7 is an interaction diagram of a process for providing federated access to social network information, in accordance with an embodiment.

FIG. 7 is an interaction diagram of a process in which utilization of a physical token causes a third party external system to be provided with federated access to social network information that can be used to enhance a user's experience at a location outside the context of a user accessing a third party web site or social networking system 130 with a client device. The user 100 utilizes 710 a physical token, such as an arcade gaming card, at gaming kiosk 110 to log in. Gaming kiosk 110 transmits 719 a message to external system 120, which in this example embodiment, is an arcade such as Dave and Busters, Jillian's, or ESPN Zone. External system 120 processes 720 the transaction message. In one implementation, external system 120 may access the account of the user identified in the transaction message to determine whether the user has registered an account corresponding to social networking system 130. If so, external system 120 may include, in a response message transmitted 729 back to gaming kiosk 110, an indication that the user has the option to grant federated access to social network information of the user to allow external system 120 to integrate his or her experience at a location corresponding to external system 120 with social networking system 130. In one implementation, the operations discussed above may be integrated with the transaction authorization and processing workflow implemented between gaming kiosk 110 and external system 120. For example, the message transmitted by gaming kiosk 110 to external system 120 may be a request to access a particular gaming application. The response transmitted by external system 120 may be an authorization response with the indication mentioned above.

Gaming kiosk 110, responsive to the indication, may present 730 a screen to the user that the user has the option to grant an external system with federated access to social network information of the user, such as to connect his or her experience with social networking system 130. For example, in addition to an authorization screen in which a user may input a signature or a Personal Identification Number (PIN), a user may be presented with selectable options, such as "Do you wish to update your status on Facebook?," and "Do you want to see your friends' gaming activity?," and the like. The user may make a selection of one or more options, which gaming kiosk 110 communicates 739 to external system 120. In some implementations, a user may be offered incentives to select certain options. For example, the user may be offered free games if he or she allows gaming kiosk to promote the game to his or her wall. In one implementation, gaming kiosk 110 may also ask the user to confirm his or her user account identifier and password. In one implementation, the message transmitted from gaming kiosk 110 to external system 120 may include an indication of the options selected by the user and a computer network address information (such as a Uniform Resource Locator (URL) or an Internet Protocol (IP) address) of a target host (here, a federated access server 701) for granting federated access to social networking system 130 on behalf of the user.

As FIG. 7 shows, external system 120 may also interact directly with social networking system 130 in response to the message. For example, if the message indicates that gaming kiosk 110 wishes to post a gaming story to the user's account, external system 120 may make an API call 740 to social networking system 130 to post this information. In one implementation, the API call may be included in a message that has been digitally signed by external system 120. External system 120 may employ one-way hash functions to generate the digital signature, such as SHA-1 or MD9, etc.

External system 120, in response to the message sent from gaming kiosk 110, may also generate 749 a federated session token and transmit the token to the end system (in FIG. 7, called a federated session server 701) corresponding to the computer network address information transmitted 739 by gaming kiosk 110. In one implementation, the federated session token is a digitally signed token that permits federated session server 701 to access social network information associated with the user 100. In one implementation, the federated access token may include one or more of an identifier corresponding to the user (used by social networking system 130 to identify an account), computer network address information corresponding to federated access server 701, indications of one or more access options selected by the user, and metadata describing the activities of the user at the location corresponding to external system 120. In one embodiment, the activities metadata may be entered by the user either at gaming kiosk 110 or using a keyboard or touch screen on the physical token itself, such as a mobile device. In another embodiment, the activities metadata may be known by virtue of gaming kiosk 110. For example, gaming kiosk 110 could have known associated metadata when the user's physical token is recognized such as the geo location, the type or genre of game, the date, time, etc. External system 120 may transmit 790 the federated access token to federated access server 701. Federated access server 701 may in turn transmit 799 a request, appended with the federated access token, to open a federated session with social networking system 130. Social networking system 130, in one implementation, having a trust relationship with external system 120, validates 760 the federated access token by verifying the digital signature generated by external system 120. If the federated access token is authenticated, social networking system 130 establishes 760 the federated access session, transmitting 769 a response to federated access server 701. In one implementation, the response transmitted to federated access server 701 may include one or more parameters associated with the session, such as encryption parameters (cypher suites, etc.), as well as a time limit for the federated access session 770. Thereafter, federated access server 701 may then access social network information of the user over federated access session 770. Social networking system 130 may also generate and transmit a notification to the user that a federated access session has been established. This notification can be transmitted in an email, a Short Message Service (SMS) message, and the like. In one implementation, the user may be prompted to respond to the message in order to keep the federated access session alive. In some implementations, the message may also include links or instructions to the user that allow the user to terminate the federated access session, as well. In some implementations, if the user's login status indicates that the user is logged in with a mobile device, social networking system 130 may push a notification to the user's mobile device.

Federated access server 701, via the federated access session 770, may access social network information associated with the user to augment the user's experience gaming kiosk 110 as previously discussed.

A variety of other implementations are possible. For example, in other implementations and as detailed below in connection with FIG. 8, the access token and corresponding user identifying information may be more directly associated with or at least maintained social networking system 130. In such an embodiment, gaming kiosk 110 or other access token presence reader may interact directly with social networking system 130 to obtain federated access for gaming kiosk 110 to obtain social data from and post gaming data to social networking system 130.

In an embodiment, a subset of the social network information requested by gaming kiosk 110 may be provided by social networking system 130 based on privacy settings of the users of social networking system 130. For example, the privacy settings may restrict the information that gaming kiosk 110 is allowed to access. The social network information provided to gaming kiosk 110 is the subset of the requested information that gaming kiosk 110 is allowed to access based on the user's privacy settings. Furthermore, the social network information requested may be information associated with the connections of the user in social networking system 130. The subset of social network information provided to gaming kiosk 110 is determined based on the privacy settings of the user as well as the privacy settings of the user's connections in social networking system 130. The enforcement of the privacy settings ensures that a user who is not allowed to see specific information associated with another user within the social networking system is not allowed to see the same information outside of the social networking system context, for example, using gaming kiosk 110.

In an embodiment, the privacy settings are not enforced by social networking system 130 and the information requested by gaming kiosk 110 is sent by social networking system 130 along with the privacy setting information of the users of the social networking system. Gaming kiosk 110 enforces the privacy settings information of the users of social networking system 130 and makes sure that a user who is not allowed to see specific information within social networking system 130 is not allowed to see the same information via gaming kiosk 110. In another embodiment, specific types of privacy settings may be enforced by social networking system 130, whereas other types of privacy setting information may be communicated to and enforced by gaming kiosk 110.

Figure 8:
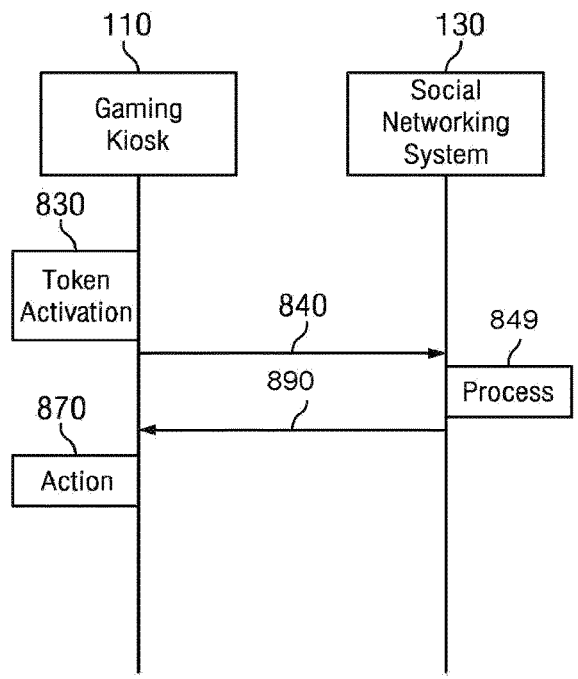
FIG. 8 is an interaction diagram of a process for providing federated access to social network information, in accordance with another embodiment.

As FIG. 8 illustrates, token activation 830 causes a physical token presence reader in gaming kiosk 110 to transmit a token activation message 840 social networking system 130. In one implementation, the token activation message includes a token identifier and gaming kiosk identifier. In particular embodiments, the token activation message may be encrypted by a private key for the user's physical token.

Social networking system 130, in one implementation, may process the token activation message 849 in a manner similar to a login request, such as decrypting the message with a public key, verifying the replay protection counter, and the like. Furthermore, in one implementation, social networking system 130 maintains a database of information that is operative to resolve a user identifier corresponding to a user account based on the token identifier. In certain implementations, the gaming kiosk may locally store some information fetched from the social networking system 130 to optimize performance of gameplay but will regularly update from social networking system 130 to verify information such as privacy changes, updates to user profile or stored value account or login status.

Social networking system 130, in one implementation, may identify a user associated with the token identifier to validate the token. Social networking system 130 may also access privacy and other configuration settings of the user to determine whether to grant federated session access to gaming kiosk 110. For example, social networking system 130 may map gaming kiosk 110 to a network application to determine whether the user corresponding to the token has granted the required access permissions. If so, social networking system 130 may transmit a session login response 890 gaming kiosk 110. In one implementation, the session login response may include a session identifier as well as an access token, such as a digitally signed token.

After gaming kiosk 110 receives a valid session login response, it may perform a variety of actions 870 as previously discussed. In summary, as a result of the foregoing, a federated access session can be established upon a simple swipe of a card or other type of activation by a user, allowing a gaming kiosk 110 or federated access server 701 to interact with social networking system 130 on the user's behalf. Particular embodiments have been described in the context of social networking websites. However, the techniques described herein may be applied to a number of other types of websites that are not necessarily concerned with social networking Such websites include any website that maintains any kind of information about users of the website and then provides that information to other users. For example, a retail website may maintain a log of users who make purchases from the website, then communicating the information about some of its users to other users using the techniques described herein.

The foregoing description of the embodiments has been presented for the purpose of illustration; it is not intended to be exhaustive or to limit the disclosure. Persons skilled in the relevant art can appreciate that many modifications and variations are possible in light of the above disclosure. For example, although the foregoing embodiments have been described in the context of a social network system, it will apparent to one of ordinary skill in the art that the disclosure may be used with any electronic social network service and, even if it is not provided through a website. Any computer-based system that provides social networking functionality can be used in accordance with the disclosure even if it relies, for example, on e-mail, instant messaging or other form of peer-to-peer communications, and any other technique for communicating between users. The disclosure is thus not limited to any particular type of communication system, network, protocol, format or application.

Some portions of this description describe particular embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Particular embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

While the foregoing processes and mechanisms can be implemented by a wide variety of physical systems and in a wide variety of network and computing environments, the server or computing systems described below provide example computing system architectures for didactic, rather than limiting, purposes.

Figure 9:
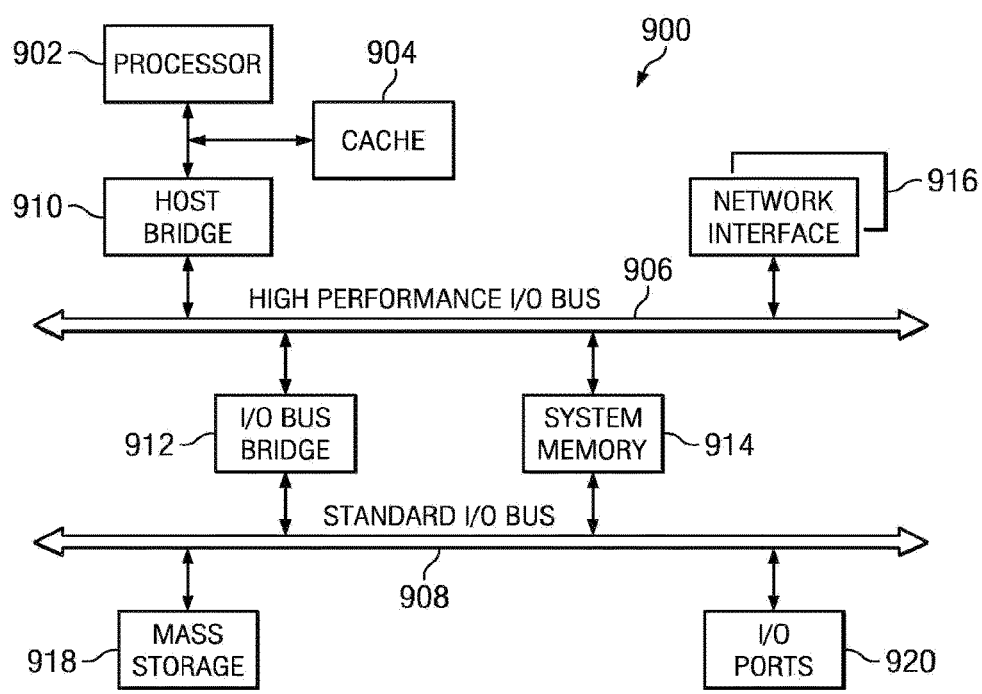
FIG. 9 is a diagram of an example computer system architecture.

FIG. 9 illustrates an example computing system architecture, which may be used to implement one or more of the computing devices identified above, such as federated access server 701. In one embodiment, hardware system 900 comprises a processor 902, a cache memory 904, and one or more executable modules and drivers, stored on a computer readable medium, directed to the functions described herein. Additionally, hardware system 900 includes a high performance input/output (I/O) bus 906 and a standard I/O bus 908. A host bridge 910 couples processor 902 to high performance I/O bus 906, whereas I/O bus bridge 912 couples the two buses 906 and 908 to each other. A system memory 914 and one or more network/communication interfaces 916 couple to bus 906. Hardware system 900 may further include video memory (not shown) and a display device coupled to the video memory. Mass storage 918, and I/O ports 920 couple to bus 908. Hardware system 900 may optionally include a keyboard and pointing device, and a display device (not shown) coupled to bus 908. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 900 are described in greater detail below. In particular, network interface 916 provides communication between hardware system 900 and any of a wide range of networks, such as an Ethernet (e.g., IEEE 802.3) network, a backplane, etc. Mass storage 918 provides permanent storage for the data and programming instructions to perform the above-described functions implemented by the respective computing systems identified above, whereas system memory 914 (e.g., DRAM) provides temporary storage for the data and programming instructions when executed by processor 902. I/O ports 920 are one or more serial and/or parallel communication ports that provide communication between additional peripheral devices, which may be coupled to hardware system 900.

Hardware system 900 may include a variety of system architectures; and various components of hardware system 900 may be rearranged. For example, cache 904 may be on-chip with processor 902. Alternatively, cache 904 and processor 902 may be packed together as a "processor module," with processor 902 being referred to as the "processor core." Furthermore, certain embodiments may not require nor include all of the above components. For example, the peripheral devices shown coupled to standard I/O bus 908 may couple to high performance I/O bus 906. In addition, in some embodiments, only a single bus may exist, with the components of hardware system 900 being coupled to the single bus. Furthermore, hardware system 900 may include additional components, such as additional processors, storage devices, or memories.

In one implementation, the operations of the nickname generating process described herein are implemented as a series of executable modules run by hardware system 900, individually or collectively in a distributed computing environment. In a particular embodiment, a set of software modules and/or drivers implements a network communications protocol stack, parallel computing functions, nickname generating processes, and the like. The foregoing functional modules may be realized by hardware, executable modules stored on a computer readable medium, or a combination of both. For example, the functional modules may comprise a plurality or series of instructions to be executed by a processor in a hardware system, such as processor 902. Initially, the series of instructions may be stored on a storage device, such as mass storage 918. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communications interface 916. The instructions are copied from the storage device, such as mass storage 918, into memory 914 and then accessed and executed by processor 902.

An operating system manages and controls the operation of hardware system 900, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft (r) Windows(r) operating systems, BSD operating systems, and the like. Of course, other implementations are possible. For example, the nickname generating functions described herein may be implemented in firmware or on an application specific integrated circuit.

Furthermore, the above-described elements and operations can be comprised of instructions that are stored on storage media. The instructions can be retrieved and executed by a processing system. Some examples of instructions are software, program code, and firmware. Some examples of storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Particular embodiments have been explained. For example, while embodiments have been described as operating in connection with a social network system, the present disclosure can be used in connection with any communications facility that allows for communication of messages between users, such as an email hosting site. In addition, while some embodiments have been described as operating in connection with a credit card transaction processing network and POS terminals, the disclosure has application to a variety of systems that include mechanisms for detecting or reading physical tokens that are associated with users. Other embodiments will be evident to those of ordinary skill in the art. It is therefore not intended that the scope of the disclosure be limited, except as indicated by the appended claims.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope, which is set forth in the following claims.

What is claimed is:

1. A method performed by one or more computing systems, the method comprising:
   receiving a message in response to detection of a token by a presence reader, wherein the presence reader is associated with a client system of a first user;
   transmitting a request to access an account associated with an external network in response to receiving the message, wherein the account is further associated with the first user;
   establishing access to the account in response to authentication of the request by a server in the external network;
   sending to the client system of the first user a reference comprising information about one or more second users of the external network, wherein the information comprises indications that the one or more second users have accessed one or more game applications associated with the external network;
   receiving from the client system of the first user an indication that the first user has accessed a particular game application of the one or more game applications associated with the external network;
   publishing a reference to the first user accessing the particular game application to the external network; and
   debiting value from a funding source associated with the account after establishing access to the account.

2. The method of claim 1, further comprising:
   detecting the token by the presence reader,
   wherein the token is a physical token and the presence reader is connected with a point of sale terminal.

3. The method of claim 1, wherein the funding source is an account at a financial institution.

4. The method of claim 1, further comprising:
   storing, in association with the account, information about a payment transaction after establishing access to the account when the token is presented to the presence reader for detection as part of a payment transaction.

5. The method of claim 1,
   wherein the funding source is a virtual currency account within a social networking system, and
   wherein the external network is the social networking system.

6. The method of claim 1, further comprising:
   receiving an access code input by a user; and
   associating the token with a social network account for a social networking system that is associated with the user,
   wherein the external network is the social networking system, and
   wherein the account is the social network account.

7. The method of claim 1, further comprising:
   requesting designation of the funding source from among a plurality of funding sources, the plurality of funding sources:
   credits associated with the account;
   an account at a financial institution.

8. The method of claim 1,
   wherein transmitting the request to access the account comprises transmitting identification data associated with the token to the external network,
   wherein the method further comprises determining an authenticity of the identification data, and
   wherein establishing access to the account in response to authentication of the request comprises establishing access to the account in response to determining that the identification data is authentic.

9. The method of claim 8, further comprising:
   detecting the token by the presence reader;
   requesting authentication information from a user in response to detecting the token; and
   generating an encrypted message in response to receiving the authentication information from the user,
   wherein transmitting the request to access the account further comprises transmitting the encrypted message to the external network, and
   wherein determining the authenticity of the identification data comprises determining the authenticity of the identification data in combination with the encrypted message.

10. A non-transitory, computer-readable medium comprising instructions that, when executed by one or more computing systems, are operable to:
    receive a message in response to detection of a token by a presence reader, wherein the presence reader is associated with a client system of a first user;
    transmit a request to access an account associated with an external network in response to receiving the message, wherein the account is further associated with the first user;
    establish access to the account in response to authentication of the request by a server in the external network;
    send to the client system of the first user a reference comprising information about one or more second users of the external network, wherein the information comprises indications that the one or more second users have accessed one or more game applications associated with the external network;
    receive from the client system of the first user an indication that the first user has accessed a particular game application of the one or more game applications associated with the external network;
    publish a reference to the first user accessing the particular game application to the external network; and
    debit value from a funding source associated with the account after establishing access to the account.

11. The medium of claim 10, wherein the instructions, when executed by the one or more computing systems, are further operable to:
    control the presence reader to detect the token,
    wherein the token is a physical token and the presence reader is connected with a point of sale terminal.

12. The medium of claim 10, wherein the instructions, when executed by the one or more computing systems, are further operable to:
    store, in association with the account, information about a payment transaction after establishing access to the account when the token is presented to the presence reader for detection as part of a payment transaction.

13. The medium of claim 10, wherein the instructions, when executed by the one or more computing systems, are further operable to:

receive an access code input by a user; and
associate the token with a social network account for a social networking system that is associated with the user,
wherein the external network is the social networking system, and
wherein the account is the social network account.

14. The medium of claim 10, wherein the instructions, when executed by the one or more computing systems, are further operable to:
request designation of the funding source from among a plurality of funding sources, the plurality of funding sources:
credits associated with the account;
an account at a financial institution.

15. The medium of claim 10,
wherein to transmit the request to access the account comprises to transmit identification data associated with the token to the external network,
wherein the instructions, when executed by the one or more computing systems, are further operable to determine an authenticity of the identification data, and
wherein to establish access to the account in response to authentication of the request comprises to establish access to the account in response to a determination that the identification data is authentic.

16. The medium of claim 15, wherein the instructions, when executed by the one or more computing systems, are further operable to:
control the presence reader to detect the token;
request authentication information from a user in response to detecting the token; and
generate an encrypted message in response to receiving the authentication information from the user,
wherein to transmit the request to access the account further comprises to transmit the encrypted message to the external network, and
wherein to determine the authenticity of the identification data comprises to determine the authenticity of the identification data in combination with the encrypted message.

17. A system comprising:
one or more processors; and
one or more non-transitory, computer-readable storage medium comprising instructions that, when executed by the one or more processors, instruct the one or more processors to:
receive a message in response to detection of a token by a presence reader, wherein the presence reader is associated with a client system of a first user;
transmit a request to access an account associated with an external network in response to receiving the message, wherein the account is further associated with the first user;
establish access to the account in response to authentication of the request by a server in the external network;
send to the client system of the first user a reference comprising information about one or more second users of the external network, wherein the information comprises indications that the one or more second users have accessed one or more game applications associated with the external network;
receive from the client system of the first user an indication that the first user has accessed a particular game application of the one or more game applications associated with the external network;
publish a reference to the first user accessing the particular game application to the external network; and
debit value from a funding source associated with the account after establishing access to the account.

18. The system of claim 17, further comprising:
the presence reader, which is configured to detect the token, and wherein the token is a physical token; and
a point-of-sale terminal connected with the presence reader,
wherein the presence reader is configured to detect another token in association with a transaction, and the point-of-sale terminal is configured to debit value from another funding source, which associated with the other token, without establishing access to the account.

19. The system of claim 17, wherein the funding source is an account at a financial institution.

20. The system of claim 17, wherein the processors are further operable when executing the instructions to store, in association with the account, information about a payment transaction after establishing access to the account when the token is presented to the presence reader for detection as part of a payment transaction.

21. The system of claim 17, wherein the funding source is a virtual currency account within a social networking system, and
wherein the external network is the social networking system.

22. The system of claim 17, wherein the processors are further operable when executing the instructions to:
receive an access code input by a user; and
associate the token with a social network account for a social networking system that is associated with the user,
wherein the external network is the social networking system, and
wherein the account is the social network account.

23. The system of claim 17, wherein the processors are further operable when executing the instructions to:
request designation of the funding source from among a plurality of funding sources, the plurality of funding sources:
credits associated with the account;
an account at a financial institution.

24. The system of claim 17, wherein to transmit the request to access the account comprises to transmit identification data associated with the token to the external network,
wherein the processors are further operable when executing the instructions to determine an authenticity of the identification data, and
wherein to establish access to the account in response to authentication of the request comprises to establish access to the account in response to a determination that the identification is authentic.

25. The system of claim 24, wherein the processors are further operable when executing the instructions to:
detect the token by the presence reader;
request authentication information from a user in response to detection of the token; and
generate an encrypted message in response to reception of the authentication information from the user,
wherein to transmit the request to access the account further comprises to transmit the encrypted message to the external network, and wherein to determine the authenticity of the identification data comprises to determine the authenticity of the identification data in combination with the encrypted message.

26. The medium of claim 10, wherein the funding source is an account at a financial institution.

27. The medium of claim 10, wherein the funding source is a virtual currency account within a social networking system, and wherein the external network is the social networking system.

\* \* \* \* \*